United States Patent
Rudd

(10) Patent No.: US 9,247,754 B1
(45) Date of Patent: Feb. 2, 2016

(54) ADJUSTABLE GAMBREL

(71) Applicant: Charles Gregory Rudd, Chipley, FL (US)

(72) Inventor: Charles Gregory Rudd, Chipley, FL (US)

( * ) Notice: Subject to any disclaimer, the term of this patent is extended or adjusted under 35 U.S.C. 154(b) by 0 days.

(21) Appl. No.: 14/603,341

(22) Filed: Jan. 22, 2015

(51) Int. Cl.
*A22C 18/00* (2006.01)
*A22B 5/06* (2006.01)

(52) U.S. Cl.
CPC .......................... *A22B 5/06* (2013.01)

(58) Field of Classification Search
USPC ................................. 452/187–193
See application file for complete search history.

(56) References Cited

U.S. PATENT DOCUMENTS

| | | | | |
|---|---|---|---|---|
| 1,020,843 A * | 3/1912 | petersen | | 452/189 |
| 1,444,900 A * | 2/1923 | Blaw | | 248/84 |
| 1,636,312 A * | 7/1927 | Mickelsen | | 452/189 |
| 2,093,732 A * | 9/1937 | Pawlitschek | | 452/191 |
| 3,108,835 A * | 10/1963 | Rowekamp | | 294/203 |
| 5,145,224 A * | 9/1992 | Welk | | 294/2 |
| 5,304,091 A * | 4/1994 | Wilkinson | | 452/192 |
| 6,264,544 B1 * | 7/2001 | Mullins | | 452/191 |
| 7,341,506 B1 * | 3/2008 | Hogue | | 452/189 |
| 7,674,160 B1 * | 3/2010 | Wheeler | | 452/102 |

\* cited by examiner

*Primary Examiner* — Richard Price, Jr.

(57) ABSTRACT

This is a sturdy, portable, adjustable gambrel device comprising a housing with a hanger or hook containing two laterally spaced bolts or rivets with two arms each rotatably attached at the proximal end to the two bolts or rivets. In one embodiment, both arms have hook members facing out at the distal ends and are each attached to an adjustable bracket to which a bolt is affixed laterally. Both bolts face each other and a handle with a threaded interior is attached to both bolts. The space between the hooks expands or contracts when the handle is rotated. The gambrel, once adjusted, keeps the hooks rigidly apart and in a fixed position for optimal field dressing. When the device is not in use it easily disassembles, folds together and fits in a compact sheath.

11 Claims, 7 Drawing Sheets

ADJUSTABLE GAMBREL

BACKGROUND OF THE INVENTION

1. Field of the Invention

The present invention relates to a hoist device and more particularly to a gambrel which may be used to hang up wild game for field dressing in a hunting context. In hunting it is important to expediently dress and/or partially butcher a slain animal in the field to prevent spoiling of the meat and to reduce the weight that must be carried out of a remote wilderness area. When an animal is on the ground it is difficult to reach all sides during field dressing and proximity to the ground increases the risk of contamination of the meat and damage to the hide of the animal. A gambrel is a rack-like device known to hunters to hoist and suspend a slain animal for field dressing. The gambrel directly contacts the animal and holds it in a rigid position, usually by the hind legs. The gambrel is usually hung by a rope or chain from a fixed overhead object such as a tree branch, or a portable structure or on a truck or an All-Terrain Vehicle (ATV). A portable winch system may be attached to help lift heavy animals.

2. Description of the Related Art

The traditional method for holding an animal for processing is by making a slice between the Achilles tendon and the lower hind leg bone and inserting a sharpened stick into the slice in each leg to suspend the animal upside-down. The key problems to be solved include that the animal may easily slide off a straight stick, the animal's hind legs may not be held rigidly in place, the low weight to strength ratio of wood requires a large heavy piece of wood to be used, and that of availability—if the hunter is hunting in area with no suitable trees or, if there are available trees, it takes time to look for and craft the right size stick. A problem solved implicitly by the stick device is that of adjustability because each stick is customized for a particular animal. In modern times inventors have devised a wide variety of solutions to the problems involved with lifting animals of various sizes and weights off the ground and suspending them in a rigid position. Prior art has solved the sliding problem by using hooks or clamps and solved the low weight to strength ratio of wood problem by using metal devices but the other issues remain problematic.

Prior art has made progress toward solving the availability problem with devices with varying degrees of portability. The primary design trade-off of prior art is between rigidity and adjustability.

Rigidity is important to hold the animal in a fixed position for field dressing. Sharp implements are used and unexpected movement and lack of control endanger the hunter and makes the job much more difficult. The gambrel designs that maximize rigidity are generally not adjustable. These are fixed "coat hanger" or inverted "V" types. These designs generally have a rigid cross-member and supporting/impaling hooks on opposite ends of the rigid cross-member. Advantages of this design include that they are simple, cheap, sturdy, and have high weight capacity. Disadvantages include very low portability because they are bulky and have large overall dimensions and can't be adjusted for multiple sizes or weight of game so several devices of varying sizes must be carried. It is difficult, for example, to suspend a wild boar from a gambrel designed to suspend an elk. There are also significant disadvantages inherent in a design having a fixed hook position because of the angles created with the legs. For example, if the hooks are too close together the hunter needs to make slice near knee tendon which obstructs the field dressing process. Even if a wide range of sizes are carried, none are going to exactly fit all animals that are hunted.

Adjustability is the most important unsolved problem. It is the nature of hunting that there is no way to know beforehand what type or weight of animal that will be obtained. There have been many attempts to solve this problem with devices of varying complexity. Prior art devices that maximize adjustability generally lack strength and rigidity and are unable to hold heavier animals. These devices include folding arms, chain or strap types and telescoping with pins. The drawbacks of these designs include that they can't be fully adjusted for various sizes or are not portable or do not maintain rigidity. A T-type design is "self adjusting" or, in practice, continuously adjusting, which means that it cannot provide rigidity. Some game supports or gambrels are too complex for practical field use and require addition optional equipment that also must be carried out into the field.

There is a need for a simple portable device that is fully adjustable yet, once adjusted, maintains rigidity. The present invention maximizes adjustability but also provides rigidity in a very strong, light, safely portable solution.

BRIEF SUMMARY OF THE INVENTION

Embodiments of the present invention address deficiencies of the art in respect to gambrel adjustability, portability and rigidity and provide a novel and non-obvious device and method for hanging game in a hunting context. In an embodiment of the invention, a housing with a hanger or hook contains two laterally spaced bolts or rivets with two arms each rotatably attached at the proximal end to the two bolts or rivets by attachment means. Both arms have hook members facing out at the distal ends and are each attached to an adjustable bracket to which a bolt is affixed laterally. Both bolts face each other and a handle with a threaded interior is threadably attached to both bolts. By rotating the handle, the width the hooks are apart expands or contracts as the bolts are introduced into the handle. This sturdy portable device enables the user to adjust the space between the hooks for a wide range of game and, once adjusted, keeps the hooks rigidly apart and in a fixed position for optimal field dressing. When the device is not in use it easily disassembles, folds together and fits in a compact sheath.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a gambrel device that enables the user to adjust the space between the hooks for a wide range of game and, once adjusted, keeps the hooks rigidly apart and in a fixed position for optimal field dressing. The present invention may be embodied within a system or a method.

Figure 1:
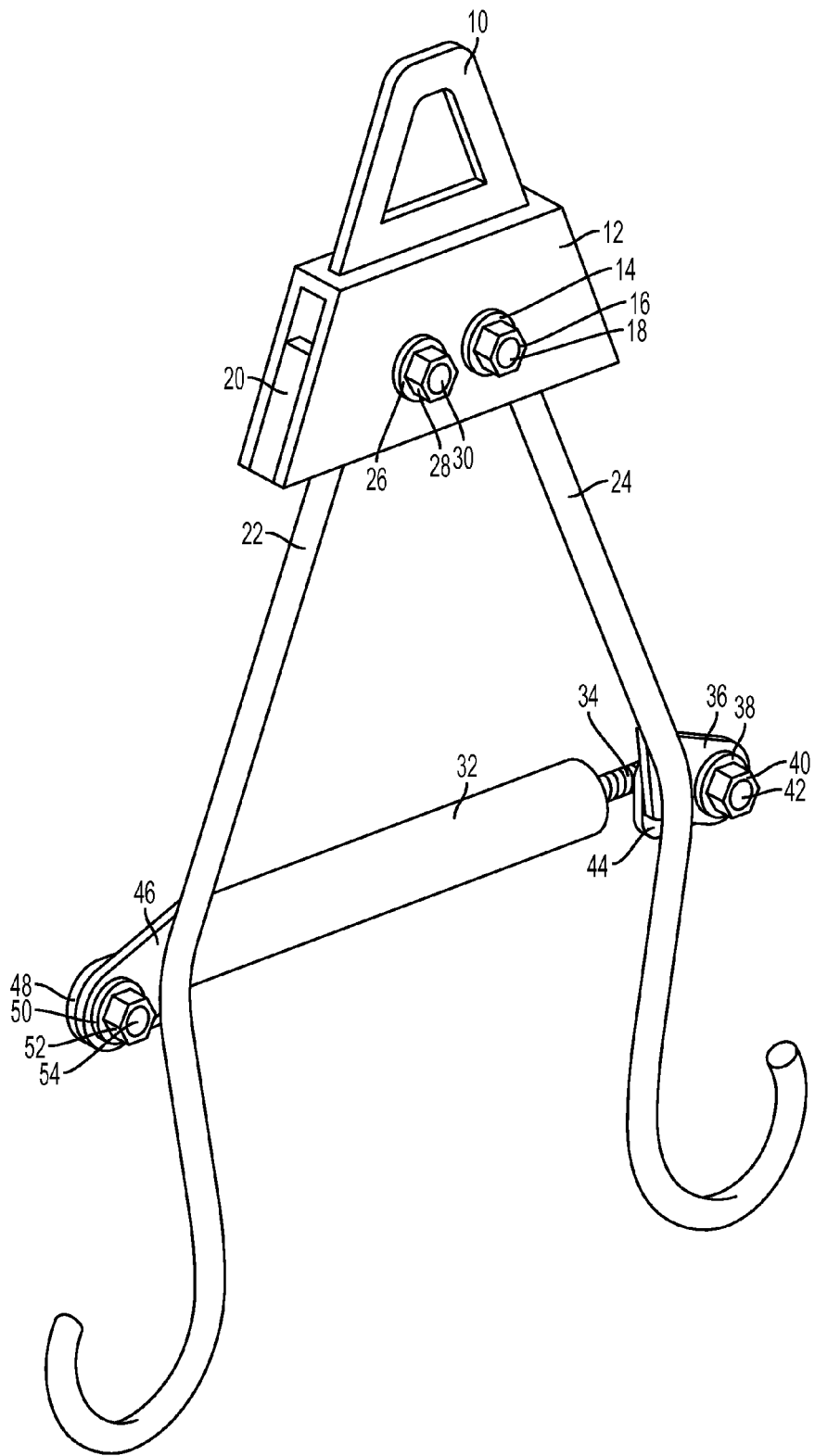
FIG. 1 depicts a perspective view of an exemplary adjustable gambrel.

FIG. 1 illustrates an exemplary adjustable gambrel device. The gambrel device consists of a housing (12) which is attached to a hanger (10) by which the gambrel assembly is attached to an overhead rope or chain. In one embodiment the hanger (10) is shown as a closed bracket but may include an open hook, clip or carabiner or any other fastening means to fasten the device to a rope, chain, cable or other hanging means. The hanger (10) is shown in one embodiment as welded to the housing (12) but may be attached by any means. One embodiment of the housing (12) contains two laterally spaced bolts (18 and 30) which span the housing's (12) hollow interior and are received on the exterior of the housing (12) by washers (14 and 26) and nuts (16 and 28). The bolts (18 and 30) may be any size but the size of these bolts determine the weight capacity of the gambrel device so large bolts are preferred. In one embodiment the proximal ends of the arms (22 and 24) rotatatibly attach to the laterally spaced bolts (18 and 30). In one embodiment the arms (22 and 24) are shaped to include a hole through which the bolts (18 and 30) pass. Other embodiments may use but are not limited to rivets, clips, bars, channels, brackets or some other rotatable attachment means to attach the arms (22 and 24) to the housing (12). The housing (12) has blocks (20 and 21) on opposite sides to stop the lateral extension of the arms. The housing (12) is shown in one embodiment as triangular but may be any shape.

In one embodiment the distal ends of the arms (22 and 24) are shaped into hook means. The hook means may face in any direction and may have any hook configuration. In another embodiment the distal ends of the arms (22 and 24) may have clamp or other fastening means. In one embodiment the arms (22 and 24) are slightly bent.

In one embodiment each of the arms (22 and 24) have a support (36 and 46) attached. In this embodiment this support (36 and 46) is welded to the arms but any means of attachment is possible. In another embodiment each arm (22 and 24) and the each support (36 and 46) are combined into one piece. In one embodiment side supports (44 and 48) are attached to each support (36 and 46) by bolts (42 and 54), washers (38 and 50) and nuts (40 and 52). In other embodiments any attachment means are possible including rivets, bars, pins, clips etc. FIG. 1 shows a bolt (34) and the handle (32) which are better viewed and described in other Figures.

Figure 2:
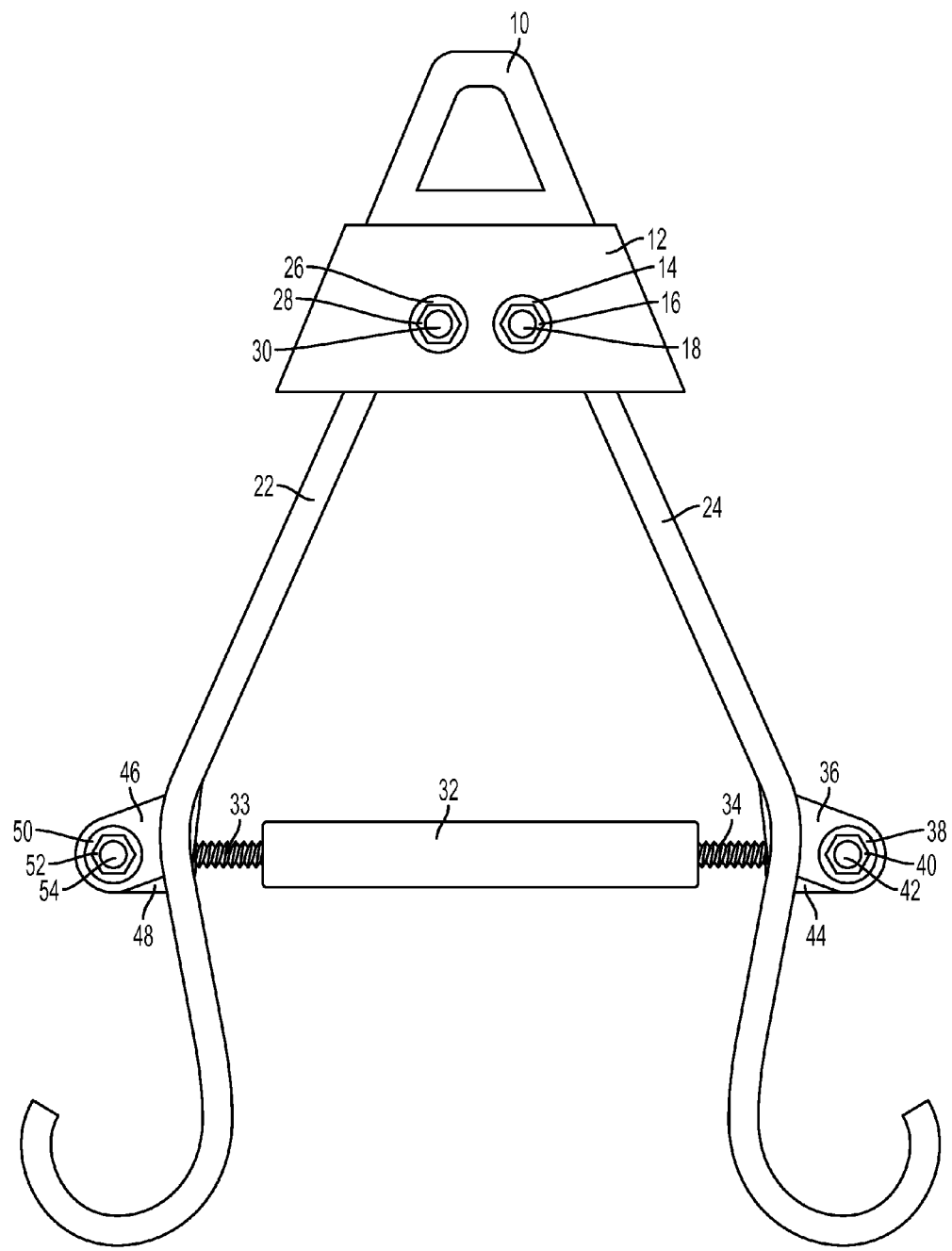
FIG. 2 depicts a front elevational view of the gambrel device of FIG. 1.

FIG. 2 shows a front elevational view of one embodiment of the adjustable gambrel. This view shows both bolts (33 and 34) and the handle (32) which will be described further in FIG. 3.

Figure 3:
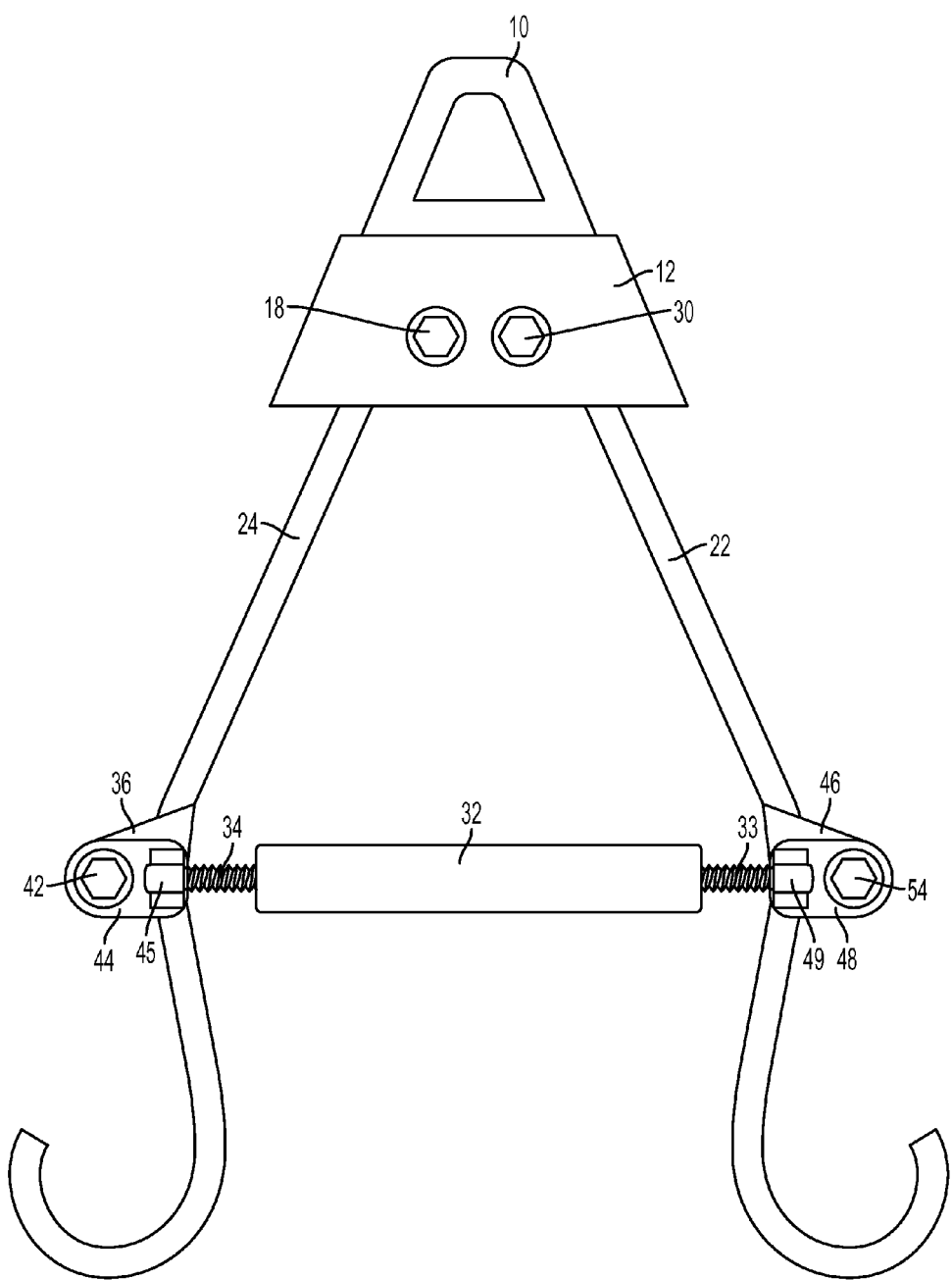
FIG. 3 depicts a rear elevational view of the gambrel device of FIG. 1.
Figure 4:
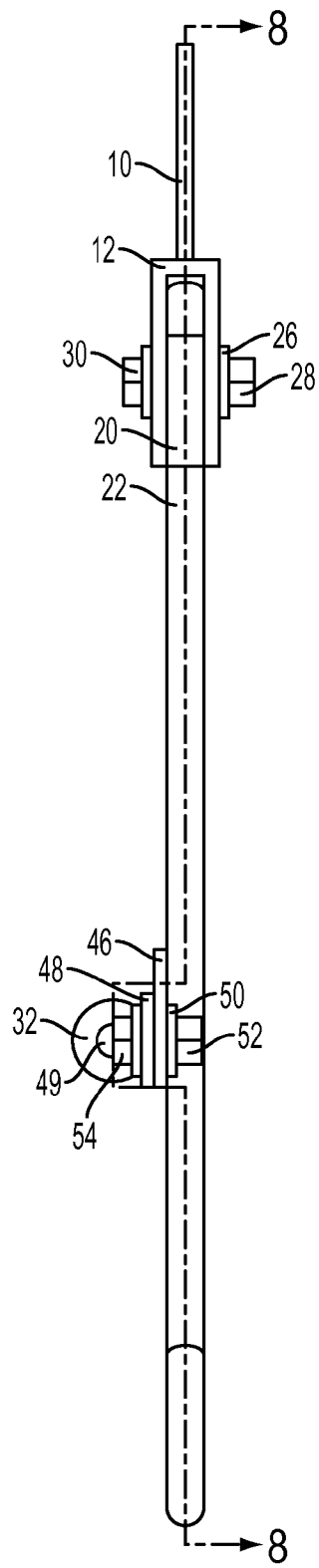
FIG. 4 depicts a left side elevational view of the gambrel device of FIG. 1.
Figure 5:
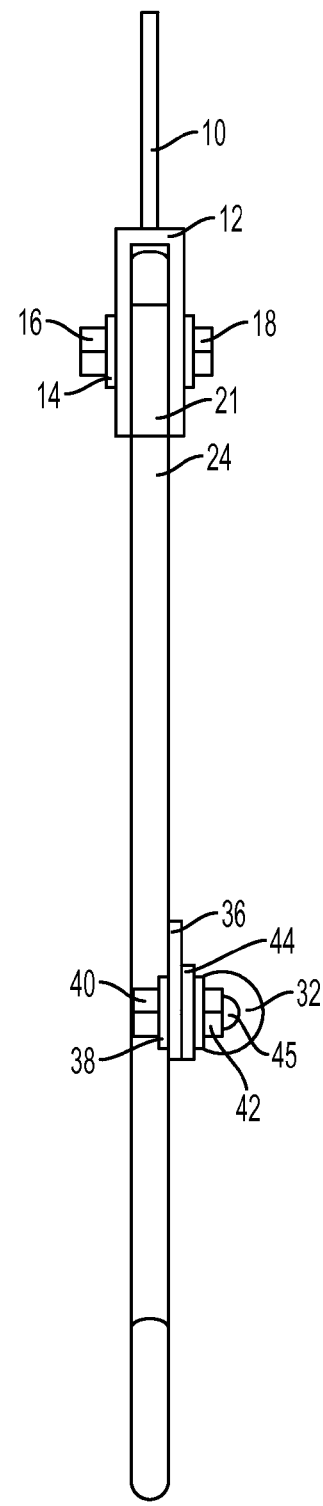
FIG. 5 depicts a right side elevational view of the gambrel device of FIG. 1.
Figure 6:
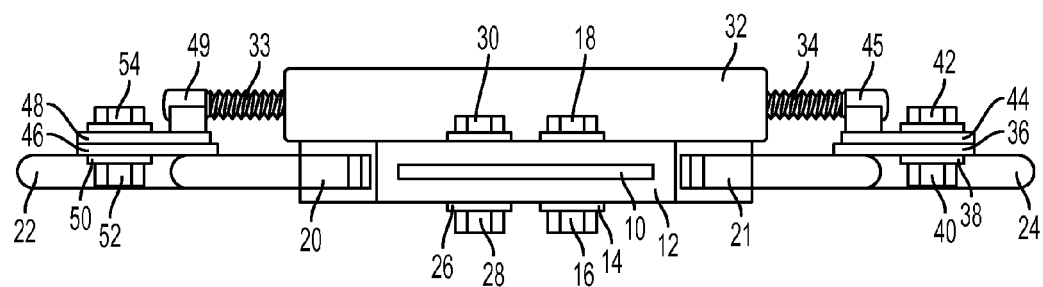
FIG. 6 depicts a top elevational view of the gambrel device of FIG. 1.
Figure 7:
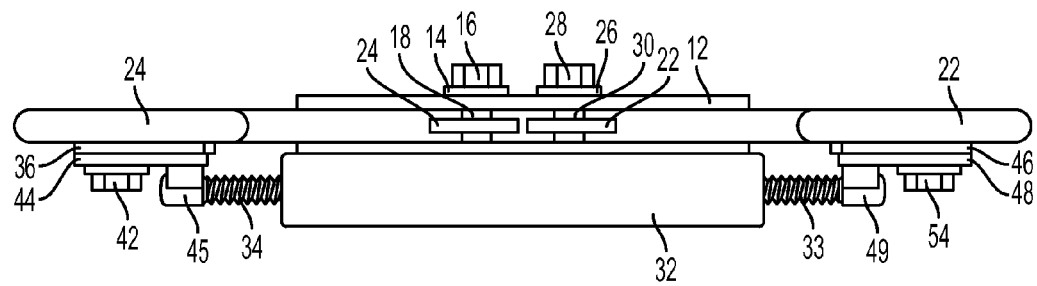
FIG. 7 depicts a bottom elevational view of the gambrel device of FIG. 1.

FIG. 3 shows a back elevational view of one embodiment of the adjustable gambrel. In one embodiment the side supports (44 and 48) each have an integrated bolt head receptacle (45 and 49) which each contain an affixed bolt (33 and 34). The bolts (33 and 34) threadably attach to the handle (32). The bolts (33 and 34) may be of any length but the combined length of the bolts (33 and 34) and the handle (32), limited by the stops (20 and 21) in the housing (12), is the maximum width capacity of the adjustable gambrel device.

FIGS. 4,5,6, and 7 show other views of one embodiment of the adjustable gambrel.

Figure 8:
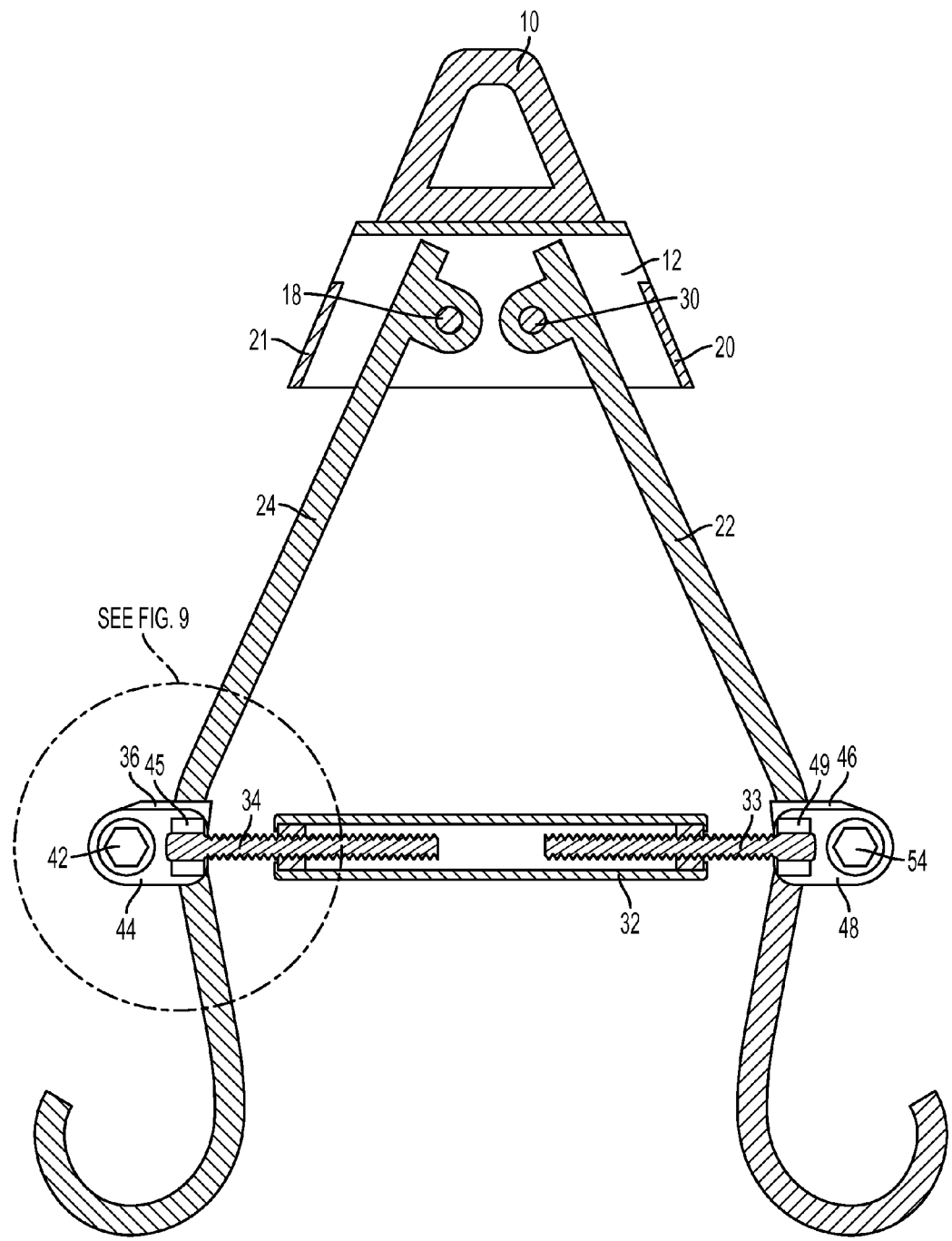
FIG. 8 depicts a cut-away view of the gambrel device of FIG. 1.

FIG. 8 shows a cut-away view of the interior of one embodiment of the housing (12) showing one possible configuration of the housing (12), the housing stops (20 and 21), the proximal ends of the arms (22 and 24) and the bolts (18 and 30). FIG. 8 also shows the interior of one embodiment of the side supports (44 and 48), the bolt head receptacles (45 and 49), the fixed bolts (33 and 34) and the handle (32).

Figure 9:
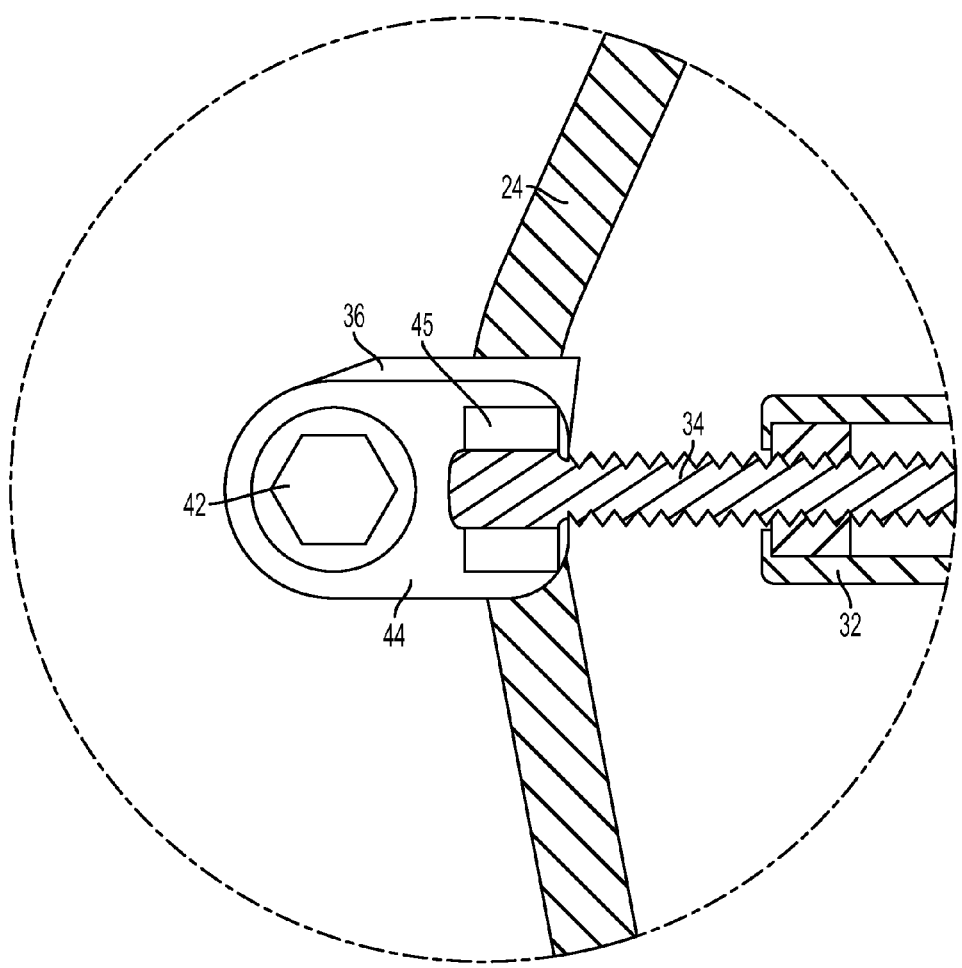
FIG. 9 depicts cut-away view of the detail of the left bracket and bolt of the gambrel device of FIG. 1.

FIG. 9 shows a cut-away view of the interior detail of the left side support assembly of one embodiment. This view details the support (36), the side support (44), the bolt (42), the bolt head receptical (45), the fixed bolt (34) and the handle (32).

In the present example, the adjustable gambrel is formed of steel, though it should be understood that any other suitable material or combination of materials may be used. In addition, housing (12), arms (22 and 24), fixed bolts (33 and 34) and handle (32) are sized and configured to hold and bear the weight of a substantially large animal, such as a large male deer, boar, bear, etc. It should also be understood that bolts (18 and 30) may have sufficient strength to hold the weight of a large animal. Fixed bolts (33 and 34) and handle (32) are configured to contract to a narrower configuration to conveniently and rigidly hold much smaller game.

In one embodiment the adjustable gambrel operates by the user twisting the handle (32). If the user wishes to expand the distance between the hooks (distal ends of 22 and 24), for example, he twists the handle (32) in the direction that pushes threads of the fixed bolts (33 and 34) outward and exposes more threads. When he stops twisting the adjustable gambrel stays in that position until the handle (32) is turned again. The outward expansion is limited by the arms (22 and 24) hitting the safety stops (20 and 21) in the housing (12). After minimal assembly, the user holds the adjustable gambrel up to the actual animal which is to undergo field dressing and adjusts the adjustable gambrel to the correct size by turning the handle (32) to expand or contract, as required. The user then attaches the gambrel to the animal usually through the rear legs, attaches a rope or chain to the hanger (10) and hoists the animal and adjustable gambrel using a fixed overhead object.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A gambrel device comprising:
   a. A hanger secured to a housing,
   b. A pair of arms pivotally secured to the housing at an attachment disposed on the housing, wherein the pair of arms define an angle therebetween, wherein the attachment is substantially centered near the angle defined by the pair of arms, wherein a free end of each arm of the pair of arms comprises an attachment adapted for securing limbs of an animal;
   c. A multiplicity of lateral stops positioned within the housing so as to prevent the pair of arms from moving; and,
   d. An adjustment assembly secured to the pair of arms, wherein the adjustment assembly comprises:
      i. a bolt secured to one of the arms, and
      ii. a handle with a threaded interior and attached to the bolt.

2. The gambrel device of claim 1, wherein the hanger is a single piece with a hole.

3. The gambrel device of claim 1, wherein the hanger is a hook.

4. The gambrel device of claim 1, wherein the hanger and the housing are one piece.

5. The gambrel device of claim 1, wherein the attachment adapted for securing limbs of an animal is a hook.

6. The gambrel device of claim 1 wherein the attachment adapted for securing limbs of an animal is a clamp.

7. The gambrel device of claim 1 wherein the adjustment assembly is comprised of:
   i. a bolt secured to a support adjustably secured to the pair of arms, and
   ii. a handle with a threaded interior and attached to the bolt.

8. The gambrel device of claim 1 wherein the adjustment assembly is comprised of:
   i. a bolt secured to a plurality of supports adjustably secured to the pair of arms, and
   ii. a handle with a threaded interior and attached to the bolt.

9. The gambrel device of claim 1 wherein the adjustment assembly is comprised of:
   i. a bolt secured to a bracket assembly which is comprised of a plurality of supports, one support being secured to one of the arms, and one support being secured to one of the bolts, and
   ii. a handle with a threaded interior and attached to the bolt.

10. The gambrel device of claim 1 wherein the adjustment assembly is comprised of:
    i. a first bolt secured to a bracket assembly which is comprised of a plurality of supports, one support being secured to one of the arms, and one support being secured to the first bolt, with the supports being secured to each other by a second bolt, and
    ii. a handle with a threaded interior and attached to the first bolt.

11. The gambrel device of claim 1 wherein the adjustment assembly is comprised of:
    i. a bolt secured to a bracket assembly which is comprised of a plurality of supports, one support being secured to one of the arms, and one support being secured to the bolt with the supports being secured to each other by a rivet, and
    ii. a handle with a threaded interior and attached to the bolt.

* * * * *